United States Patent [19]

Suzuki

[11] Patent Number: 4,642,834
[45] Date of Patent: Feb. 17, 1987

[54] WASHING APPARATUS
[75] Inventor: Tsuneo Suzuki, Tokyo, Japan
[73] Assignee: Suzuki Mechanical Engineering Co., Ltd., Japan
[21] Appl. No.: 777,177
[22] Filed: Oct. 16, 1985

Related U.S. Application Data

[63] Continuation of Ser. No. 658,383, Oct. 5, 1984, Pat. No. 4,581,785.

[30] Foreign Application Priority Data

Oct. 8, 1983 [JP] Japan.................................................58-188922

[51] Int. Cl.[4] .............................................. A46B 11/06
[52] U.S. Cl. ..................................... 15/21 R; 15/29; 401/47; 401/191; 401/288
[58] Field of Search .................. 15/21 R, 22 R, 97 R, 15/104.9, 104.92, 101, 22, 212; 401/42, 44, 47, 48, 191, 288; 134/102

[56] References Cited

U.S. PATENT DOCUMENTS

| | | | |
|---|---|---|---|
| 344,267 | 6/1886 | Goulding | 15/104.9 |
| 968,902 | 8/1910 | Van Leir | 15/104.9 |
| 1,630,995 | 5/1927 | Withycombe | 401/288 |
| 1,824,994 | 9/1931 | Herold et al. | 15/104.9 X |
| 2,170,740 | 8/1939 | Volckening | 15/104.9 |
| 2,960,710 | 11/1960 | McKeegan | 401/47 |

Primary Examiner—Edward L. Roberts
Attorney, Agent, or Firm—Darby & Darby

[57] ABSTRACT

A washing apparatus includes a nozzle having a liquid inlet to which a liquid pump is connected for supplying a wash liquid under pressure thereto. The nozzle has an outlet for discharging the wash liquid. A hollow sweeper member is connected at one end to the outlet of the nozzle for discharging the wash liquid in a jet from the other end. The sweeper member has at the other end a sweeper portion comprising a plurality of flexible strips peripherally mounted around the other end whereby the flexible strips are caused to flutter when the jet of wash liquid is discharged from the other end.

1 Claim, 6 Drawing Figures

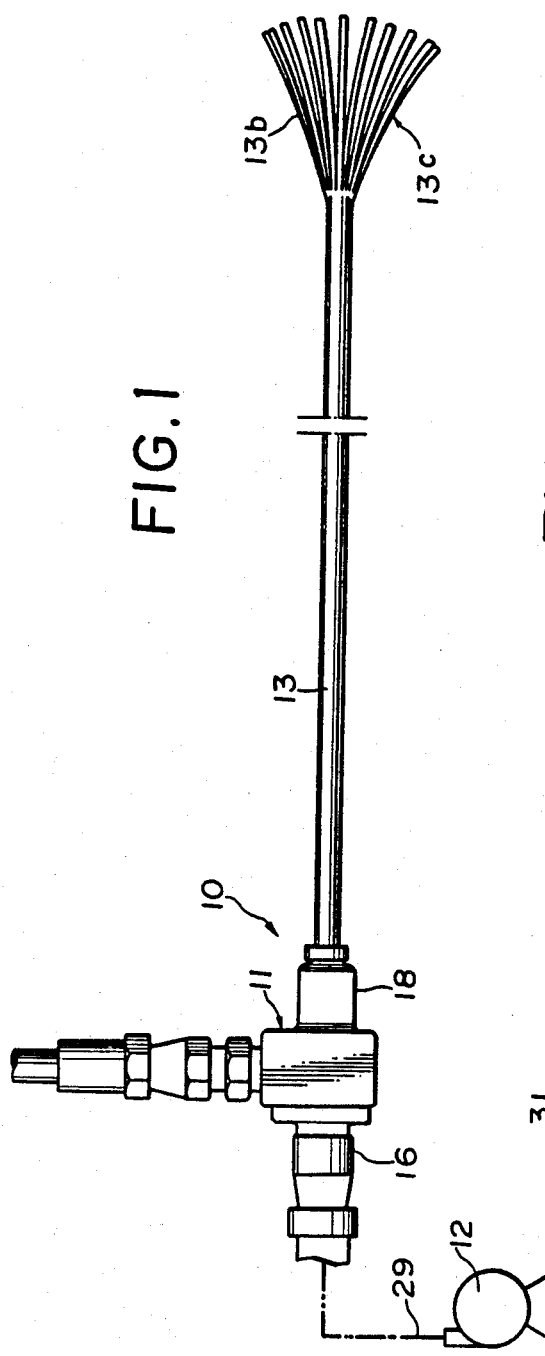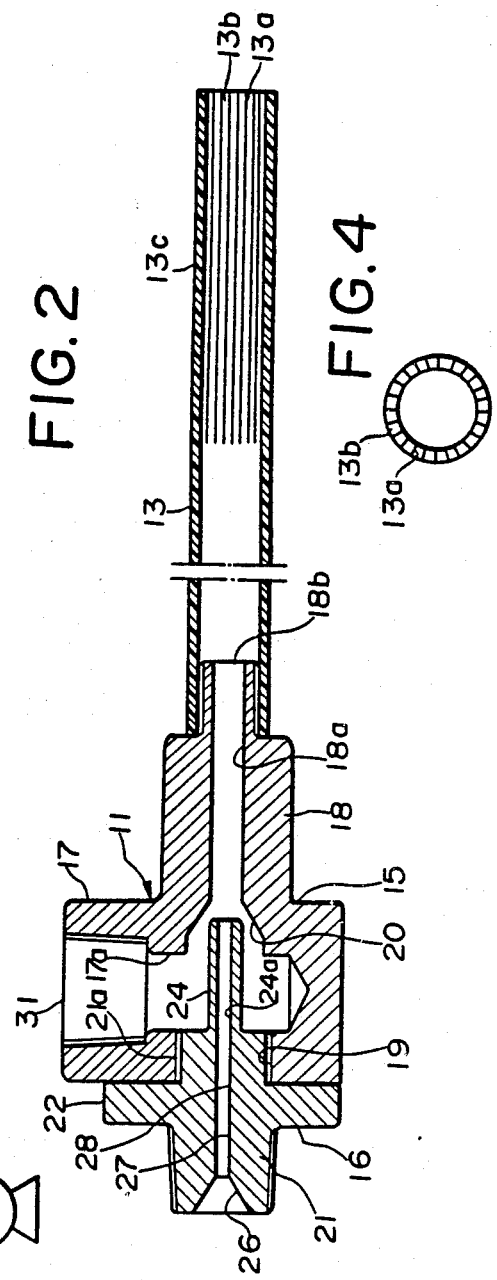

WASHING APPARATUS

This is a continuation application based upon application U.S. Ser. No. 658,383 filed Oct. 5, 1984, now U.S. Pat. No. 4,581,785.

BACKGROUND OF THE INVENTION

1. Field of the Invention

This invention relates to a washing apparatus or washer which directs jets of wash liquid against an object to be washed to thereby remove dirt and dust therefrom.

2. Prior Art

One conventional method of washing an object such as a vehicle body has been to continuously apply a wash liquid such as water to the object and rub it by a brush. With this method, dirty portions of the object can be cleaned satisfactorily, but it is rather difficult to clean rugged portions of the object by the brush. In addition, this method requires much time and labor, and also there is the possibility that the object may be damaged by the brushing.

Another conventional washing method has been to inject jets of wash liquid from a nozzle and direct them against the object to be washed to thereby blow the dirt and dust away therefrom. This method is advantageous in that the washing can be carried out without causing damage to a surface of the object to be washed because of the use of jets of wash liquid. In addition, rugged portions on the object can be easily cleaned. However, generally, the washing ability of this method is inferior to that of the first-mentioned conventional method using the brush. Therefore, in order to enhance the washing ability, the jets of washing liquid must be rendered strong, in which case there is the risk that the surface of the object to be washed is subjected to damage by the increased pressure of the jets of wash liquid. Therefore, this method is not applicable to those cases where it is not desirable to apply an excessive pressure to the surface of the object to be washed, such as the washing of an airplane body.

SUMMARY OF THE INVENTION

It is therefore an object of this invention to provide a washing apparatus of the type which can efficiently wash an object using a jet of washing fluid without applying an excessive pressure to the surface of the object.

According to the present invention, there is provided a washing apparatus which comprises a liquid pump for supplying wash liquid under pressure; a nozzle having a liquid inlet to which the liquid pump is connected to apply the wash liquid thereto, the nozzle having an outlet for discharging the wash liquid; and a hollow sweeper member connected at one end to the outlet of the nozzle for discharging the wash liquid in a jet from the other end, the sweeper member having at the other end a sweeper portion comprising a plurality of flexible strips peripherally mounted around the other end whereby the flexible strips are caused to flutter when the jet of wash liquid is discharged from the other end.

BRIEF DESCRIPTION OF THE DRAWINGS

FIG. 1 is a side-elevational view of a washing apparatus provided in accordance with the present invention;

FIG. 2 is a cross-sectional view of the washing apparatus;

FIG. 4 is an end view of the sweeper member;

DESCRIPTION OF THE PREFERRED EMBODIMENTS OF THE INVENTION

Figure 3:
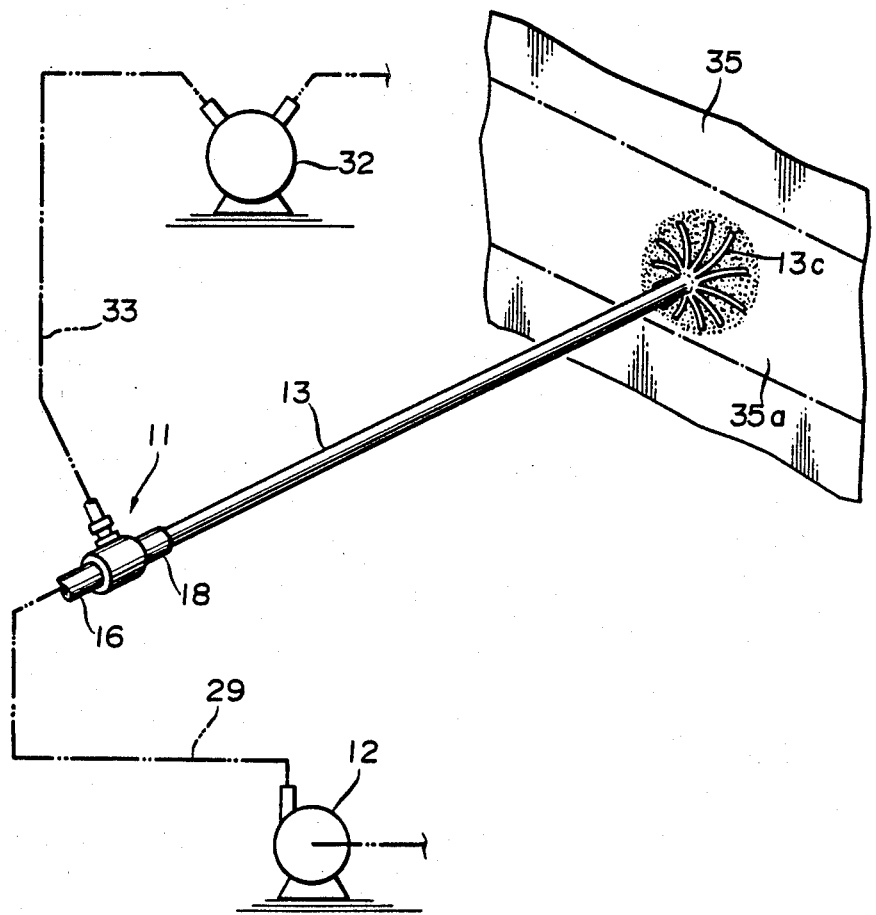
FIG. 3 is a schematic view showing the operation of the washing apparatus.

A washing apparatus 10 shown in FIG. 1 comprises a nozzle 11, a liquid pump 12 for feeding a wash liquid to the nozzle 11, and a sweeper member 13 for directing a jet of wash liquid against a surface of an object to be washed. As best shown in FIG. 2, the nozzle 11 is of a two-piece construction and comprises a main body 15 and a fitting 16. The main body 15 has a major hollow cylindrical portion 17 and a tubular portion 18 extending perpendicularly from the cylindrical portion 17, the cylindrical portion 17 having an internally-threaded aperture 19 formed therethrough. The cylindrical portion 17 has an aperture 20 disposed in opposed relation to the threaded aperture 19 and communicating with a bore 18a of the tubular portion 18, the aperture 20 tapering toward the tubular portion 18. The free end of the tubular portion 18 serves as an outlet 18b for discharging the wash liquid as later described.

The fitting 16 has a cylindrical portion 21, a peripheral flange 22 formed around the cylindrical portion 21 intermediate opposite ends thereof, and a tubular portion 24 extending from one end of the cylindrical portion 21. That part of the cylindrical portion 21 disposed between the flange 22 and the tubular portion 24 is externally-threaded to provide a threaded section 21a which is threaded into the internally-threaded aperture 19 to connect the main body 15 and the fitting 16 together. The tubular portion 24 is received within the chamber 17a of the cylindrical portion 17 with its free end disposed in the aperture 20 in closely spaced relation to the bore 18a. The cylindrical portion 21 has a liquid inlet 26 at one end remote from the tubular portion 24 and has a bore 27 formed therein and communicating the inlet 26 with a bore 24a of the tubular portion 24, the bore 27 and the bore 24a jointly providing a continuous straight passageway 28 for the wash liquid. The liquid pump 12 is connected via a pressure-resistant hose 29 to the inlet 26 for feeding the wash liquid under pressure to the nozzle 11. The passageway 28, and the bore 18a of the tubular portion 18 are disposed in coaxial relation to each other.

An open end 31 of the cylindrical portion 17 of the main body 15 serves as an air inlet to which an air compressor 32 (FIG. 3) is connected via a pressure-resistant hose 33. The compressed air fed from the compressor 32 to the chamber 17a of the cylindrical portion 17 is caused to mix with the wash liquid at the tapered aperture 20 in which the free end of the tubular portion 24 is disposed. This arrangement is similar to an aspirator of the conventional type as hereinafter more fully described.

The sweeper member 13 comprises a tube made of a flexible material such as a soft synthetic resin and rubber. The flexible tube 13 is secured at one end to the free end of the tubular portion 18 which is reduced in diameter. The flexible tube or sweeper member 13 has a plurality of slits 13a formed in the other end and extending along the length thereof as best shown in FIGS. 2 and 4 to provide a plurality of strips 13b which constitutes a sweeper portion 13c.

The operation of the washing apparatus 10 will now be described. First, the liquid pump 12 is connected to the inlet 26 of the nozzle 11 via the hose 29 for feeding the wash liquid under a preselected pressure to the nozzle 11, and the compressor 32 is connected to the inlet 31 via the hose 33 for feeding compressed air under a preselected pressure to the nozzle 11. As described above, the nozzle 11 is of a construction similar to the aspirator, and therefore even if the pressure of the compressed air is lower than the pressure of the wash liquid, the wash liquid discharged in a jet from the free end of the tubular member 24 will not flow toward the inlet 31. Instead, the jet of wash liquid draws the compressed air the bore 18a through the tapered aperture 20 to form a mixture of them, and this liquid/air mixture is fed through the bore 18a of the tubular member 18 and the flexible tube or sweeper member 13 and is discharged in a jet from the sweeper portion 13c. At this time, the pressure of this mixture is of such a magnitude that the flexible tube 13 bent downwardly so far is caused to extend straight. And, the strips 13b of the sweeper portion 13c are caused by the pressurized liquid/air mixture to flutter or move irregularly. Therefore, when the sweeper portion 13c of the flexible tube 13 is brought into contact with a surface of an object 35 to be washed, the jet of wash fluid is caused to impinge on the surface, and the fluttering strips 13b impart a sweeping action to the surface, so that dirt, dust and the like on the surface are swept away therefrom. When the flexible tube 13 is moved along an area 35a of the object surface indicated in a dots-dash line in FIG. 3, this area 35a is cleaned. In this case, even if the surface of the object 35 is rugged, that is, it has projections, the flexible strips 13b flutter and sweep away the dirt and dust on the surface with the aid of the jet of wash fluid. Thus, the surface of the object 35 can be efficiently cleaned without causing damage to it. In addition, the washing medium or fluid is provided in the form of a liquid/air mixture having a less specific gravity than the liquid itself, and the fluttering of the strips 13b will further decrease the pressure of the liquid/air mixture to be discharged from the flexible tube 13. Therefore, the possibility of damage to the surface of the object 35 will be further prevented.

When the compressor 32 is not connected to the inlet 31 of the nozzle 11 with the inlet 31 being opened and when the wash liquid is fed to the nozzle 11 from the liquid pump 12, the air is drawn into the bore 18a of the tubular portion 18 through the space between the tapered aperture 20 and the tip end of the tubular portion 24 to form the liquid/air mixture together with the wash liquid. In this condition, the flexible tube 13 is caused to extend to effect the washing operation to some extent. However, the air content of the mixture or fluid passing through the flexible tube 13 is small, and the flow rate of this fluid is low, so that the flexible tube can not be maintained straight and is subjected to vibration or movement. And, when the inlet 31 is closed with only the wash liquid passing through the flexible tube 13, the flow rate of the fluid passing through the flexible tube 13 is low, so that the flexible tube 13 is not caused to extend with its free end directed downwardly and is subjected to substantial movement. Thus, in this condition, the washing operation can not be carried out. However, if the straight passageway 28 of the nozzle 11 has a relatively large diameter, the washing operation can be effected to some extent. However, in this case, the flexible tube 13 is subjected to wavy action or movement, and a substantially increased flow rate of the wash liquid passing through the flexible tube 13 is required. As a result, the surface of the object 35 is subjected to an increased pressure. This is not desirable.

Figure 5:
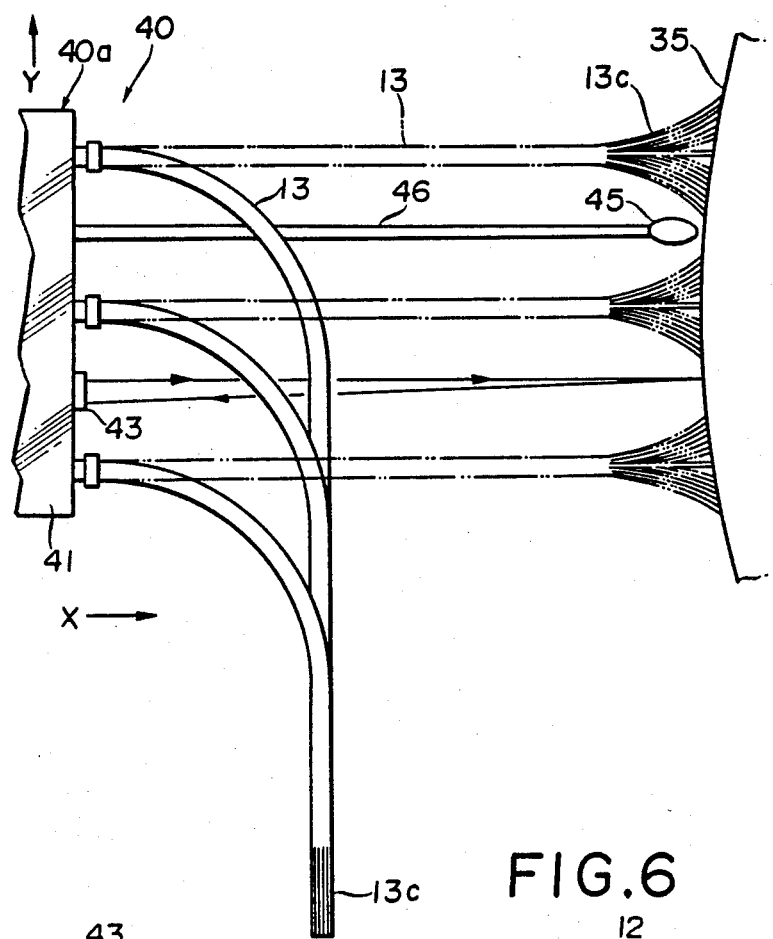
FIG. 5 is a washing unit incorporating a plurality of washing apparatuses.

A washing system 40 shown in FIG. 5 comprises a washing unit 40a which comprises a movable base 41 and a plurality of washing apparatuses 10 shown in FIG. 1. The washing apparatuses 10 are mounted on the base 41 in juxtaposed relation, and the base 41 is moved by a drive means (not shown) in both directions X and Y in FIG. 5. A photosensor 43 is mounted on the base 41 to sense the distance between the base 41 and the object 35 to be washed. A detector 45 is also mounted on the base 41 through an elongated support member 46. The detector 45 comprises an oval body made of a soft material and is operated to feed a detection signal upon contact with the surface of the object 35.

Figure 6:
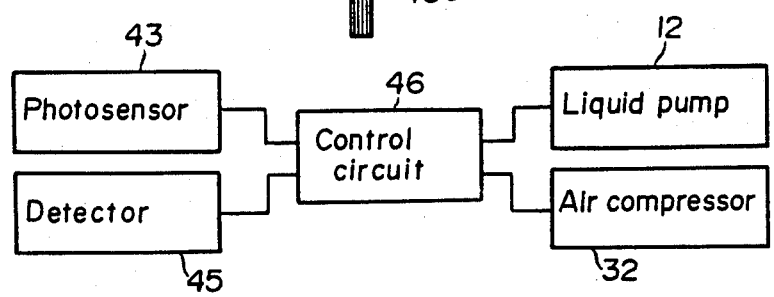
FIG. 6 is a block diagram of a washing system incorporating the washing unit.

The operation of the washing system 40 will now be described with reference to FIG. 6. The base 41 is moved in the direction Y in FIG. 5, and the base 41 is also moved in the direction X toward the object 35. When the distance between the base 41 and the surface of the object 35 reaches a predetermined distance, the photosensor 43 feeds a sensing signal to a control circuit 46 under the control of which the liquid pump 12 and the compressor 32 are operated to feed the wash liquid and the compressed air, respectively, to the nozzle of each washing apparatus of the washing system 40. As a result, the flexible tubes 13 are caused to extend straight by the fluid passing therethrough to bring the sweeper portion 13c of each washing apparatus into contact with the surface of the object 35. Thus, the surface of the object 35 is washed and cleaned in the manner described above for the washing apparatus 10 in FIG. 1. The distance between the base 41 and the surface of the object 35 is kept constant by the photosensor 43 during the movement of the base 41 in the direction Y. Upon contact with the surface of the object 35 or a projection thereon, the detector 46 feeds the detection signal to the control circuit 46 under the control of which the base 41 is moved away from the surface of the object 35 to cause the sweeper portion 13c to properly contact with the surface of the object 35.

The washing system may comprises a plurality of washing units 40a to effect the washing over a greater area easily and quickly.

The washing tests were carried out using samples 1 to 11 shown in TABLE below, and two kinds of nozzles 11 having flow paths 28 having respective diameters of 4 mm and 5 mm were prepared for each sample except for sample 11. The washing test was made to clean a honeycomb part of an airplane which required a fluid pressure of 100 g/cm$^2$ for the cleaning. The nozzle for sample 11 had no inlet 31 and the diameter of its passageway 28 was 6 mm. The flexible hoses 13 were made of various materials shown in TABLE were used. The flexible hose 13 for sample 2 comprised a hose of vinyl and a sweeper portion 13c secured to the free end of the hose and composed of cotton strings. The results of the washing tests are also shown in TABLE. As seen from TABLE, sample 10 achieved the most excellent washing, and sample 2 was acceptable. The sweeper portion formed by cutting the distal end of the flexible tube longitudinally achieved a better cleaning effect than that formed by the cotton strings of sample 2. It was preferred that the length of the strips 13b and therefore the length of the slits 13a were 60 mm. With respect to sample 11, the washing medium was solely made of the wash liquid, and therefore it was necessary to increase the flow rate of the liquid. This increased the pressure to which the objected to be washed was subjected, and therefore was not desirable. It was concluded that the flexible tube 13 was caused to extend straight with the sweeper portion 13c effecting a satisfactory movement when the parameters of the nozzle 11 of the aspirator type and the pressures of the wash liquid and compressed air were optimally selected, in which case a relatively small pressure of not more than 20 g/cm$^2$ was applied to the surface of the object to be washed.

In the case where no pressure limitation is imposed upon the surface of the object to be washed, only the use of wash liquid of a high pressure as the washing medium can move or flutter the sweeper portion 13c and achieve a satisfactory cleaning. Also, in the case where the sweeper portion 13c secured to a hose of either a flexible or a rigid material is made of stringers of cotton, sponge or the like, a satisfactory washing can be carried out if the pressure of the washing fluid is increased to a necessary extent.

As described above, with the washing apparatus according to the present invention, the jet of washing fluid and the sweeper portion can jointly provide for a satisfactory washing operation without exerting an undue pressure on the surface of the object to be washed.

TABLE

| sample | kind | hose length | hose diameter | length of slits (mm) | pressure of wash liquid (atm) | pressure of compressed air (atm) | width of area washed (mm) | remarks |
|---|---|---|---|---|---|---|---|---|
| 1 | leather of deer | 400 | 6 | 60 | 7 | 4 | 150 | hose moved violently |
| 2 | vinyl hose with cotton strings | 400 | 6 | — | 7 | 4 | 40 | strings did not move enough |
| 3 | nylon fabric | 400 | 6 | 60 | 7 | 4 | 80 | hose end was relatively stable |
| 4 | nylon fabric | 500 | 8 | 70 | 10 | 6 | — | hose did not extend horizontally |
| 5 | nylon fabric | 400 | 7 | 60 | 15 | 6 | 90 | hose subjected to slight vibration |
| 6 | nylon fabric | 400 | 6 | 60 | 10 | 5 | 90 | relatively stable washing was made |
| 7 | natural rubber | 400 | 6 | 60 | 4 | 5 | 90 | sweeper portion did not flutter enough |
| 8 | natural rubber | 500 | 8 | 100 | 5 | 8 | — | sweeper portion did not flutter enough |
| 9 | natural rubber | 400 | 7 | 60 | 8 | 5 | 80 | washing could be made but was a little unstable |
| 10 | natural rubber | 400 | 7 | 60 | 10 | 5 | 90 | hose extended straight and stable washing was made |
| 11 | natural rubber (no air inlet) | 400 | 7 | 60 | 12 | — | — | hose was moved but washing was made. wash liquid was much used |

What is claimed is:

1. A washing apparatus comprising:
a liquid pump for supplying wash liquid under pressure; and
a washing unit including:
a nozzle having a liquid inlet to which said liquid pump is connected to apply the wash liquid thereto, an outlet, a passage interconnecting said liquid inlet and said outlet, and an air inlet communicating with said passage for introducing air thereinto to form a liquid/air mixture; and
a sweeper member comprising a flexible hose secured at one end to said outlet of said nozzle for discharging the liquid/air mixture in a jet from the other end, said flexible hose having a substantially uniform cross-section throughout the entire length thereof and having at said other end a plurality of slits formed therethrough and extending along a length thereof to provide a plurality of flexible strips, said flexible hose being so flexible that it is bent downwardly under the influence of gravity, whereby said flexible hose is caused to extend straight with said flexible strips fluttering when the jet of liquid/air mixture is discharged from said other end.

* * * * *